(12) United States Patent
Witham et al.

(10) Patent No.: US 9,631,131 B2
(45) Date of Patent: Apr. 25, 2017

(54) POLYAMINOPOLYAMIDE-EPICHLORO-HYDRIN RESINS FOR USE AS CLAY AND SHALE INHIBITION AGENTS FOR THE DRILLING INDUSTRY

(71) Applicant: Dow Global Technologies LLC, Midland, MI (US)

(72) Inventors: Cole A. Witham, Pearland, TX (US); Michael K. Poindexter, Sugar Land, TX (US); Stephen W. King, League City, TX (US); Prashant Tatake, Mumbai (IN)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/649,581

(22) PCT Filed: Jan. 27, 2014

(86) PCT No.: PCT/US2014/013145
§ 371 (c)(1),
(2) Date: Jun. 4, 2015

(87) PCT Pub. No.: WO2014/123709
PCT Pub. Date: Aug. 14, 2014

(65) Prior Publication Data
US 2015/0353807 A1      Dec. 10, 2015

(30) Foreign Application Priority Data
Feb. 7, 2013 (IN) .............................. 527/CHE/2013

(51) Int. Cl.
C09K 8/24 (2006.01)
C08G 73/02 (2006.01)
C08L 79/02 (2006.01)

(52) U.S. Cl.
CPC ............ C09K 8/24 (2013.01); C08G 73/0286 (2013.01); C08G 73/0293 (2013.01); C08L 79/02 (2013.01); C09K 2208/12 (2013.01)

(58) Field of Classification Search
None
See application file for complete search history.

(56) References Cited

U.S. PATENT DOCUMENTS

| | | | | |
|---|---|---|---|---|
| 3,305,493 A | * | 2/1967 | Emmons | C08G 69/48 162/164.3 |
| 4,605,068 A | | 8/1986 | Young et al. | |
| 4,664,818 A | | 5/1987 | Halliday et al. | |
| 5,169,441 A | * | 12/1992 | Lauzon | D21H 17/55 106/416 |
| 5,197,544 A | | 3/1993 | Himes | |
| 5,380,706 A | | 1/1995 | Himes et al. | |
| 5,728,653 A | | 3/1998 | Audibert et al. | |
| 5,771,971 A | | 6/1998 | Horton et al. | |
| 5,908,814 A | | 6/1999 | Patel et al. | |
| 6,247,543 B1 | | 6/2001 | Patel et al. | |
| 6,484,821 B1 | | 11/2002 | Patel et al. | |
| 6,544,933 B1 | | 4/2003 | Reid et al. | |
| 6,609,578 B2 | | 8/2003 | Patel et al. | |
| 7,091,159 B2 | | 8/2006 | Eoff et al. | |
| 2002/0155956 A1 | | 10/2002 | Chamberlain et al. | |
| 2003/0106718 A1 | | 6/2003 | Patel et al. | |
| 2009/0131280 A1 | * | 5/2009 | Federici | C08G 59/182 507/117 |
| 2010/0310776 A1 | * | 12/2010 | Brungardt | C09D 179/02 427/391 |

FOREIGN PATENT DOCUMENTS

| WO | WO 2006/013595 A1 | 2/2006 |
|---|---|---|
| WO | WO 2006/013596 A1 | 2/2006 |
| WO | WO 2006/013597 A1 | 2/2006 |

* cited by examiner

Primary Examiner — John J Figueroa

(57) ABSTRACT

The hydration of clays and shale in drilling operations may be inhibited by employing an aqueous based drilling fluid comprising a shale hydration inhibition agent comprising a polyaminopolyamide-epichlorohydrin resin, preferably the polyamino polyamide-epichlorohydrin resin is a reaction product of an aliphatic polyamine, an aliphatic polycarboxylic acid, and epichlorohydrin. The shale hydration inhibition agent should be present in the aqueous based drilling fluid in sufficient concentration to reduce the reactivity, such as swelling, of clays and shale when exposed to water-based drilling fluids.

12 Claims, No Drawings

POLYAMINOPOLYAMIDE-EPICHLORO-HYDRIN RESINS FOR USE AS CLAY AND SHALE INHIBITION AGENTS FOR THE DRILLING INDUSTRY

FIELD OF THE INVENTION

The present invention relates to shale hydration inhibition agents for the drilling industry, specifically polyaminopolyamide-epichlorohydrin (PAE) resins which are effective for the reduction of reactivity, for example the inhibition of swelling, of clay and shale which comes into contact with the fluids used in the drilling and construction of oil and gas wells for the petroleum industry.

BACKGROUND OF THE INVENTION

In the rotary drilling of wells a drilling fluid circulates throughout the underground well to carry cuttings from the bit and to transport these cuttings to the surface. Contemporaneously, the drilling fluid cools and cleans the drill bit, as well as reduces friction between drill string and the drilled hole, and also stabilizes uncased sections of the well. Usually drilling fluids form a low permeability filter cake in order to seal any permeability associated with the surrounding geological formations.

Drilling fluids may be classified according to their fluid base: oil based fluids with solid particles suspended in an oil continuous phase and, possibly, water or brine may be emulsified with the oil. Alternatively, water based fluids contain solid particles suspended in water or brine. Various chemicals may be added, deliberately or otherwise, to water based drilling fluids: a) organic polymers or clays used to impart viscosity and fluid loss reduction; b) insoluble inorganic minerals to increase the fluid density as well as help decrease fluid loss; c) soluble salts used to increase the mud's density; and d) during the drilling operation formation solids may disperse into the drilling fluid.

Formation solids that become dispersed in a drilling fluid include cuttings from drilling, soil, and solids from surrounding unstable formation. When the formation yields solids that are clay minerals which are reactive, for example swell, disperse, migrate or undergo swelling-induced migration, this can potentially compromise drilling time and increase costs.

Clays are typically composed of sheets or layers of aluminosilicate minerals having exposed surface hydroxyls. The basal plane of the clay surface is negatively charged and as such cations are readily adsorbed onto the surface. These cations may be exchangeable. Substitutions within the clay structure and the presence of exchangeable cations affect the tendency of the clay to swell in water. For example surface hydration gives swelling with water molecules adsorbed on clay surfaces. Many types of clays can swell in this manner.

Another type of swelling is called osmotic swelling, when interlayer ion concentration leaches water between the clay unit layers, swelling the clay. Only some clays can undergo osmotic swelling. All types of clay and shale instability, such as swelling, can cause a series of problems. For example, drag between the drill string and the sides of the borehole may be increased. This can cause loss of fluid circulation and sticking of the drill string and bit.

This is why development of effective clay instability inhibitors is important to the oil and gas exploration industry. The present invention works towards a solution to these difficulties.

Many types of clay inhibitors are known including the use of inorganic salts such as potassium chloride. Numerous patents have been filed which describe techniques or products which can be used to inhibit clay swelling. Without completely summarizing the patent literature, and by way of example, we can cite the inhibitor compositions based on: a) inorganic phosphates, described in U.S. Pat. No. 4,605,068; b) polyalkoxy diamines and their salts, in U.S. Pat. Nos. 6,484,821; 6,609,578; 6,247,543; and US Publication No. 20030106718; c) choline derivatives described in U.S. Pat. No. 5,908,814; d) oligomethylene diamines and their salts, in U.S. Pat. No. 5,771,971 and US Publication No. 20020155956; e) the addition product of carboxymethyl cellulose and an organic amine, in WO 2006/013595; f) 1,2-cyclohexanediamine and/or their salts, in WO 2006/013597; g) salts of phosphoric acid esters of oxyalkylated polyols, in WO 2006/013596; h) the combination of a partially hydrolyzed acrylic copolymer, potassium chloride and polyanionic cellulose, in U.S. Pat. No. 4,664,818; i) quaternary ammonium compounds, in U.S. Pat. Nos. 5,197,544 and 5,380,706; j) polymers based on dialkyl aminoalkyl methacrylate, in U.S. Pat. No. 7,091,159; k) aqueous solutions containing a polymer with hydrophilic and hydrophobic groups, in U.S. Pat. No. 5,728,653; and l) the reaction product of a polyhydroxyalkane and an alkylene oxide, in U.S. Pat. No. 6,544,933.

SUMMARY OF THE INVENTION

The present invention is an aqueous based drilling fluid composition and method of using said aqueous based drilling fluid composition for reducing the reactivity such as swelling of clays and shale in drilling operations wherein the aqueous based drilling fluid comprises an aqueous based continuous phase, a reactive clay or shale material, and a shale hydration inhibition agent comprising a polyaminopolyamide-epichlorohydrin resin, preferably said polyaminopolyamide-epichlorohydrin resin is a reaction product of an aliphatic polyamine, an aliphatic polycarboxylic acid, and epichlorohydrin.

In one embodiment of the present invention described herein above, the aliphatic polyamine is diethylenetriamine (DETA), one or more congener of triethylenetetramine (TETA), one or more congener of tetraethylenepentamine (TEPA), one or more congener of pentaethylenehexamine (PEHA), dipropylenetriamine (DPTA), linear tripropylenetetramine (L-TPTA), bis(2-piperazin-1-ylethyl)amine (BPEA), or mixtures thereof and the aliphatic polycarboxylic acid is oxalic acid, malonic acid, succinic acid, malic acid, tartaric acid, glutaric acid, adipic acid, pimelic acid, suberic acid, azelaic acid, sebacic acid, citric acid, isocitric acid, propane-1,2,3-dicarboxylic acids, or mixtures thereof.

Preferably, the aliphatic polyamine and aliphatic polycarboxylic acid reaction product which is subsequently reacted with epichlorohydrin to make the shale hydration inhibition compound of the present invention described herein above is the reaction product of adipic acid and DETA, adipic acid and TETA, adipic acid and L-TETA, adipic acid and a mixture of DETA and TETA, adipic acid and a mixture of DETA and L-TETA, adipic acid and a mixture of TETA and L-TETA; or adipic acid and a mixture of TETA, L-TETA and DETA.

Various chemicals can be added, deliberately or not, to water-based drilling fluids: a) organic polymers or clays used to impart viscosity and fluid loss reduction; b) insoluble inorganic minerals to increase the fluid density as well as help decrease fluid loss; c) soluble salts used to increase the mud's density; and d) during the drilling operation formation solids may disperse into the drilling fluid.

The solids, which disperse into the fluid, include cuttings from the drilling operation and from the unstable geological surrounding formations. For example, the aqueous based drilling fluid described herein above may optionally further comprise one or more of a fluid loss control agent, a weighting material, a viscosifying agent, a bridging agent, an anti-bit balling agent, a dispersant, a lubricant, a corrosion inhibitor, a defoamer, salts, a surfactant, or suspending agent.

The aqueous phase of the aqueous based drilling fluid described herein above preferably is fresh water, sea water, brine, mixtures of water and water soluble organic compounds, or mixtures thereof.

DETAILED DESCRIPTION OF THE INVENTION

The present invention is directed to a water-based drilling fluid for use in drilling wells through a formation containing a clay or shale which is unstable (sometimes referred to as reactive clay or shale material) and for example may swell, in the presence of water. Generally the drilling fluid of the present invention includes a shale hydration inhibition agent and an aqueous continuous phase. As disclosed below, the drilling fluids of the present invention may also include additional components, such as of a fluid loss control agent, a weighting material, a viscosifying agent, a bridging agent, an anti-bit balling agent, a dispersant, a lubricant, a corrosion inhibitor, a defoamer, salts, a surfactant, or suspending agent and the like which may be added to an aqueous based drilling fluid.

During the drilling of wells, a drilling fluid is circulated down the drill string, through the drill bit and back to the surface for reconditioning and reuse. The drilling fluid suspends the drill cuttings originating from the drilling process and transports the cuttings to the surface. At the same time the drilling fluid cools and cleans the drill bit, reduces the friction between the drill pipe and the borehole walls and stabilizes the sections of the well that are prone to collapse.

Normally the drilling fluids form a filter cake of low permeability which prevents leaking into the surrounding geological formations and avoids excessive losses of the liquid phase of the drilling fluid itself. Drilling fluids can be classified according to the nature of their continuous liquid phase. There are oil-based drilling fluids, sometimes referred to as oil-based muds (OBM), in which the solids are suspended in a continuous oleaginous phase and optionally water or a brine phase is emulsified into the oleaginous phase. Alternatively, water-based drilling fluids, sometimes referred to as water-based muds (WBM), contain solids suspended in water or brine.

When the drilling operation encounters swellable or reactive clay-like materials, they can compromise drilling time and increase costs. There are different kinds of clays and shale that swell, disperse, and/or migrate and they can cause numerous operational problems. For the purposes of this application, the term "clay" is defined as a variety of phyllosilicate minerals rich in silicon and aluminum oxides and hydroxides which include variable amounts of structural water, illustratively including kaolinite, bentonite, dickite, halloysite, chrysotile, lizardite, amesite, talc, montmorillonite, beidellite, saponite, hectorite, sauconite, vermiculite, muscovite, paragonite, phlogopite, biotite, lepidolite, margarite, clintonite, anandite, donbassite, cookeite, sudoite, clinochlilore, chamosite, nimite, hydrotalcite, meixnerite, stevensite, nontronite, nacrite, hydrobiotite, glauconite, illite, bramallite, chlorite, attapulgite and sepiolite. The clay content of the formations can be comprised substantially of a single species of clay mineral, or of several species, including the mixed layer types of clay.

Also, for the purposes of this application, the term "shale" is defined to mean a fine-grained sedimentary rock formed by the consolidation of clay, silt, or mud. It is characterized by a finely laminated structure which imparts fissures parallel to the bedding along which the rock may easily break. As used herein, the term "shale" is also defined to mean materials that may "swell" or increase in volume or disperse or migrate, when exposed to water. Reactive shale may be problematic during drilling operations because of, inter alia, their tendency to degrade when exposed to aqueous media such as aqueous-based drilling fluids. This degradation, of which swelling is one example, can result in undesirable drilling conditions and undesirable interference with the drilling fluid. For instance, the degradation of the shale may interfere with attempts to maintain the integrity of drilled cuttings traveling up the wellbore until such time as the cuttings can be removed by solids control equipment located at the surface.

Further, for the purpose of this application, the term "shale hydration inhibition agent" refers to an agent that positively affects (e.g., reduces) the reactivity of a reactive clay or shale by reducing one or more of the amount of swelling, dispersing, migration, swelling-induced migration, and the like when in the presence of water.

The swelling increases the friction between the drill pipe and the borehole walls, causes drilling fluid losses and sticking between the drill pipe and the borehole walls. Other forms of shale instability, such as dispersing, migration, swelling-induced migration, and the like, further adversely impact drilling operations. For this reason the development of swelling inhibitors for clays and shale is important for the oil and gas industry. The invention works in this direction to solve these problems.

It has now been found that suitable polyaminopolyamide-epichlorohydrin (PAE) resins perform effectively as shale hydration inhibition agents to positively affect the reactivity of clay and/or shale. Polyaminopolyamide-epichlorohydrin (PAE) resins are well known, for example see U.S. Pat. No. 2,926,154 and US Publication No. 2012/0199299, which are both incorporated by reference herein in their entirety. Water-based drilling fluids comprising the shale hydration inhibition agent of the present invention have been revealed to be excellent shale hydration inhibitors for the petroleum industry, being able to effectively inhibit clay and shale swelling in drilling processes and subterranean formations.

Shale hydration inhibition agents of the present invention are polyaminopolyamide-epichlorohydrin resins. Polyaminopolyamide-epichlorohydrin resins suitable for the present invention are water soluble, cationic thermosetting resins typically prepared by reacting one or more polyalkylene polyamines containing secondary amine groups and one or more polycarboxylic acid derivatives to form a polyaminoamide and then reacting the polyaminopolyamide with epichlorohydrin to form the polyaminopolyamide-epichlorohydrin resin.

The polyaminopolyamide backbone of the polyaminopolyamide-epichlorohydrin resin is generally made from the condensation polymerization of one or more organic polycarboxylic acid derivatives and one or more polyalkylene polyamines under conditions suitable for forming long-chain polyamides, preferably at temperatures higher than about 130° C. for several hours with removal of water or alcohol byproducts. Generally, a sufficient amount of organic acid derivative to react with substantially all of the primary amino groups but insufficient to react to any significant degree with the secondary amino groups of the polyalkylene polyamine is used.

The polyaminopolyamide synthesis is generally carried out neat although some water may be added to facilitate mixing of monomers (10 to 20 percent based on monomers) and removed with the water of polycondensation.

The polyaminopolyamide-epichlorohydrin resins are preferably the reaction product of an aliphatic polyamine and an aliphatic polycarboxylic acid, which is then treated with epichlorohydrin. The aliphatic polycarboxylic acid is preferably represented by the following formula:

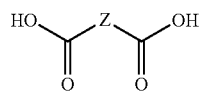

I wherein Z is $(CH_2)_x$ and x is an integer 0 to 8
or
Z is represented by the following formula:

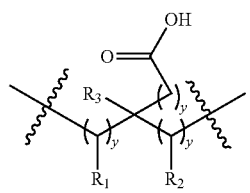

II wherein each y is independently an integer from 0 to 8 and $R_1$, $R_2$, and $R_3$ are independently H or OH.

Preferred aliphatic polycarboxylic acids include are oxalic acid, malonic acid, succinic acid, malic acid, tartaric acid, glutaric acid, adipic acid, pimelic acid, suberic acid, azelaic acid, sebacic acid, citric acid, isocitric acid, propane-1,2,3-dicarboxylic acids, and mixtures thereof.

Suitable aliphatic polyamines useful in the present invention are represented by, but not limited to, the following formulas:

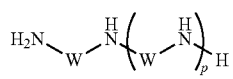

III wherein each W independently is $(CH_2)_s$ and s is an integer from 2 to 8 and p is an integer 1 to 8;

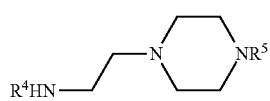

IV wherein $R^4$ is H and $R^5$ is $-CH_2CH_2NH_2$, $R^4$ is $-CH_2CH_2NH_2$ and $R^5$ is H, or $R^4$ is:

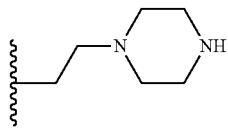

V and $R^5$ is H;
or mixtures thereof.

Examples of suitable aliphatic polyamines are diethylenetriamine (DETA); bis(2-piperazin-1-ylethyl)amine (BPEA); triethylenetetramine (a specific congener or mixtures thereof (TETA)), preferably linear triethylenetetramine (L-TETA); tetraethylenepentamine (a specific congener or mixtures thereof (TEPA)), linear tetraethylenepentamine (L-TEPA); pentaethylenehexamine (a specific congener or mixtures thereof (PEHA)); dipropylenetriamine (DPTA); and linear tripropylenetetramine (L-TPTA).

Some polyamines may comprise one or more congener, for example TETA may comprise a mixture of one or more of the following congeners:

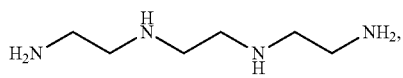

VI

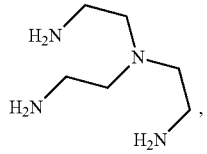

VII

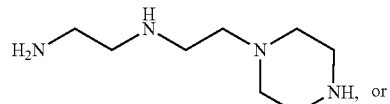

VIII

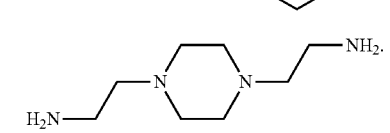

IX

In converting the polyaminopolyamide resin, formed as above described, to a cationic thermosetting resin, it is reacted with epichlorohydrin at a temperature from 25° C. to 100° C. and preferably between 35° C. to 70° C. until the viscosity of a 20 percent solids solution at 25° C. has reached about C or higher on the Gardner Holdt scale. This reaction is preferably carried out in aqueous solution to moderate the reaction. Although not necessary, pH adjustment can be done to increase or decrease the rate of crosslinking.

The polyaminopolyamide-epichlorohydrin resins of the present invention are reaction product(s) of an aliphatic polycarboxylic acid and aliphatic polyamine. In some instances, the aliphatic polyamine may comprise more than one congener having a similar chemical formula. As defined herein, the generic chemical name for an aliphatic polyamine of a specific chemical formula is used to refer to a mixture comprising more than one congener of the polyamine, for example, a mixture of any combination of the four triethylenetetramine congeners illustrated herein above is referred to as triethylenetetramine or TETA. Whereas individual congeners are specifically identified, for example, if only the linear congener of TETA is desired (VI), it is referred to as linear triethylenetetramine or L-TETA. If only the linear congener of tripropylenetetramine is desired, it is referred to as linear tripropylenetetramine or L-TPTA. When an aliphatic polyamine having more than one congener is reacted with an aliphatic polycarboxylic acid, the reaction product will necessarily comprise a mixture of polyaminopolyamide resins.

In one embodiment of the present invention, a proposed reaction product of adipic acid, DETA, and epichlorohydrin is represented by the following scheme:

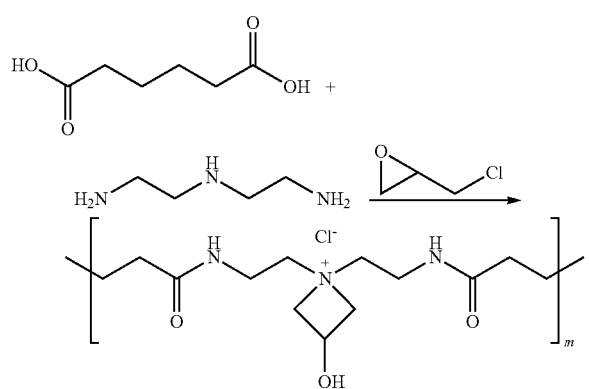

wherein the weight-average degree of polymerization (m) is from 1 to 3,200, preferably 5 to 1,000, more preferably 15 to 300, more preferably 25 to 135, and even more preferably 35 to 100.

In one embodiment of the present invention, a proposed reaction product of adipic acid, DETA, L-TETA, and epichlorohydrin is represented by the following scheme:

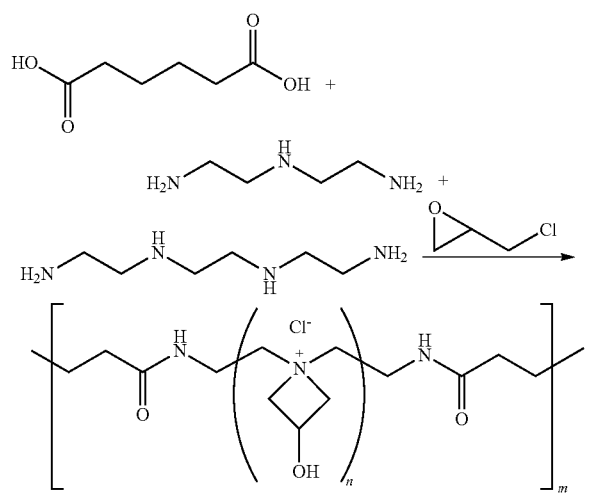

wherein when n is equal to 1, the weight-average degree of polymerization (m) is from 1 to 3,200, preferably 5 to 1,000, more preferably 15 to 300, more preferably 25 to 135, and even more preferably 35 to 100, and when n is equal to 2, the weight-average degree of polymerization (m) is from 1 to 2,700, preferably 5 to 1,000, more preferably 10 to 200, more preferably from 20 to 100, and even more preferably from 25 to 65.

It is desirable, in some cases, to increase the spacing of secondary amino groups on the polyamide molecule in order to change the reactivity of the polyaminopolyamide-epichlorohydrin complex. This can be accomplished by substituting a diamine such as ethylenediamino, propylenediamine, hexamethylenediamine and the like for a portion of the polyalkylene polyamine. For this purpose, up to about 80 percent of the polyalkylene polyamine may be replaced by molecularly equivalent amount of the diamine. Usually a replacement of about 50 percent of less will serve the purpose.

Preferably, the molar ratio of primary amine functionality to carboxylic acid functionality in the reaction product of the polyamine and an aliphatic polycarboxylic acid is from 0.2:1 to 1.8:1, more preferably from 0.5:1 to 1.5:1, and even more preferably from 0.8:1 to 1.2:1.

Preferably the polyaminopolyamide to epichlorohydrin ratio per secondary amine content in the polyamine is 1:0.25 to 1:2.

Suitable polyaminopolyamide resins may have a broad molecular weight distribution comprising molecules having an apparent molecular weight, relative to polyethylene glycol and polyethylene oxide standards, up to 895,000 g/mol. Molecular weight calculations preferably are determined by conventional size exclusion chromatography using polyethylene glycol and polyethylene oxide molecular weight standards, two Tosoh Bioscience G5000 PWXL-CP size exclusion chromatography columns as the separation media, and a Wyatt Optilab T-rEX refractive index detector to measure concentration.

The molecular weight of the polyaminopolyamide polymer varies according to the reaction temperature, the specific monomers used for the reaction, their ratio, and reaction time. The reaction time is partially determinative of the molecular weight of the intermediate polymer, wherein a longer reaction time generally corresponds to a higher molecular weight. The reaction time can be adjusted to provide an intermediate polymer having the appropriate molecular weight for the desired application. Typically, at the beginning of the reaction the polymerization mixture may be pasty, but as the polymerization reaction proceeds, the contents of the reaction vessel become clear and the viscosity increases. A sample can be withdrawn from the polymerization mixture, and the viscosity determined. In general, the formation of the appropriate intermediate polymer results in a clear solution after water addition having a Brookfield viscosity of about 135-195 cps, and preferably 150-180 cps.

Preferably, said polyaminopolyamide broad molecular weight distributions may have a number average molecular weight (Mn) equal to or greater than 400, preferably equal to or greater than 550, and more preferably equal to or greater than 700. Preferably, said polyaminopolyamide broad molecular weight distribution may have a number average molecular weight equal to or less than 2,500, preferably equal to or less than 1,500, and more preferably equal to or less than 1,100.

Preferably, said polyaminopolyamide broad molecular weight distribution may have a weight average molecular weight (Mw) equal to or greater than 5,000, preferably equal to or greater than 8,000, and more preferably equal to or greater than 12,000. Preferably, said polyaminopolyamide broad molecular weight distribution may have a weight average molecular weight equal to or less than 95,000, preferably equal to or less than 45,000, and more preferably equal to or less than 30,000.

Preferably, the polydispersity (Mw/Mn) for the polyaminopolyamide resin of the present invention is equal to or greater than 2, preferably equal to or greater than 5, and more preferably equal to or greater than 10. Preferably, Mw/Mn for the polyaminopolyamide resin of the present invention is equal to or less than 250, preferably equal to or less than 100, and more preferably equal to or less than 50.

The shale hydration inhibition agent should be present in sufficient concentration to reduce either or both the surface hydration based swelling and/or the osmotic based swelling of the clay or shale. The exact amount of the shale hydration inhibition agent present in a particular drilling fluid formulation can be determined by a trial and error method of testing the combination of drilling fluid and shale formation encountered. Generally however, the shale hydration inhibition agent of the present invention may be used in drilling fluids in a concentration from about 1 to about 18 pounds per barrel (lbs/bbl or ppb) and more preferably in a concentration from about 2 to about 12 pounds per barrel of drilling fluid.

The aqueous based drilling mud contains an aqueous based continuous phase and may contain one or more of normally used additives well known by those skilled in the art, such as of a fluid loss control agent, a weighting material, a viscosifying agent, a bridging agent, an anti-bit balling agent, a dispersant, a lubricant, a corrosion inhibitor, a defoamer, salts, a surfactant, or suspending agent. Useful fluid loss control agents are organic polymers, starches, cellulosics, and mixtures thereof. Useful weighting materials may be selected from: barite, hematite, iron oxide, calcium carbonate, magnesium carbonate, magnesium organic and inorganic salts, calcium chloride, calcium bromide, magnesium chloride, zinc halides, alkali metal formates, alkali metal nitrates and combinations thereof.

The aqueous based continuous phase may generally be any water based fluid phase that is compatible with the formulation of a drilling fluid and is compatible with the shale hydration inhibition agents disclosed herein. In one preferred embodiment, the aqueous based continuous phase is selected from: fresh water, sea water, brine, mixtures of water and water soluble organic compounds, and mixtures thereof. The amount of the aqueous based continuous phase should be sufficient to form a water based drilling fluid. This amount may range from nearly 100 percent of the drilling fluid to less than 30 percent of the drilling fluid by volume. Preferably, the aqueous based continuous phase is from about 95 percent to about 30 percent by volume and preferably from about 90 percent to about 40 percent by volume of the drilling fluid.

EXAMPLES

Examples 1 to 4 are polyaminopolyamide-epichlorohydrin (PAE) resins made by the following procedure where the amount for each reactant is listed in Table 1: adipic acid (commercial grade from Rankem Labs) and 200 g of water (de-ionized water) are added to a round bottom flask equipped with a stirrer. To this mixture, an amount of aliphatic polyamine(s) is added drop wise at about 120° C. After complete addition, the reaction mass is allowed to react for about 2 hours. The mass is then allowed to cool to about 60° C. then an additional 200 grams of water are added followed by the addition of the epichlorohydrin ("epi") which is added dropwise. The contents are maintained at 60° C. with stirring. The reaction is allowed to proceed to completion for 2 hours. The final product is an aqueous solution of a polyamide epichlorohydrin resin. The aliphatic polyamine and resin characterization for Examples 1 to 4 is listed in Table 1. For Example 4, the two aliphatic polyamines are mixed together before adding dropwise to the reaction mixture. In Table 1:

"DETA" is diethylenetriamine available from The Dow Chemical Company;

"L-TETA" is linear triethylenetetramine available from The Dow Chemical Company; and "TETA" is a mixture of congeners of triethylenetetramine represented by structures VI, VII, VII, and IX in amounts of about 67, 4, 17, and 10 weight percents respectively (with the balance being other amines), available from The Dow Chemical Company.

The amount of water in the product is determined by and reported as percent based on the total weight of the reaction product.

Molecular weight is determined by conventional size exclusion chromatography using polyethylene glycol and polyethylene oxide molecular weight standards, two Tosoh Bioscience G5000 PWXL-CP size exclusion chromatography columns as the separation media, and a Wyatt Optilab T-rEX refractive index detector to measure concentration and is reported as weight average molecular weight in g/mol.

TABLE 1

| Example | Amine | Amine, g | Adipic acid, g | Epi, g | Water content, % | MW, g/mol |
|---|---|---|---|---|---|---|
| 1 | DETA | 30 | 48.19 | 32.15 | 80.2 | 27,900 |
| 2 | L-TETA | 30 | 34.02 | 44.88 | 83.8 | 14,000 |
| 3 | TETA | 34 | 38.56 | 29.36 | 78.5 | 20,000 |
| 4 | DETA: L-TETA | 24:6 | 45.35 | 34.54 | 80.8 | 80,000 |

Examples 6 to 9 are polyaminopolyamide-epichlorohydrin resin shale inhibitors of the present invention (Examples 1 to 4, respectively) tested on a base sample of mud material (Example 5). The base sample of mud material comprises fresh water (348 ml), xanthan polymer (1.2 pound per barrel (ppb)), polyanionic cellulose (1.5 ppb), an amount of sodium hydroxide to provide a pH of 10, and 50 g of 2 to 4 mm sized London clay cuttings (from an outcrop in the UK) to generate one barrel equivalent (i.e., 1 g per 350 ml=1 pound per barrel (ppb)) of base mud. Four percent of a given polyaminopolyamide-epichlorohydrin resin shale inhibitor is added to a bottle containing a sample of the wellbore material. Example 5 is the base sample of mud material with no shale inhibitor added. Percents are based on weight of the total composition.

Cutting Recovery is determined by capping and rolling said bottles at 185° F. for 16 hours. After rolling, the bottles are cooled to ambient temperature (68° F. to 77° F.), and the cuttings are carefully poured onto a 2 mm sieve and gently washed with fresh water. The cuttings are blotted dry and placed in a tared boat, and the wet mass measured ("water content weight"). The cuttings are then dried overnight, and the dry mass content is measured ("recovery weight"):

recovery weight/water content weight×100=percent recovery.

Cutting Hardness is determined following the same procedure described above, but with a duplicate set of bottles, the cuttings isolated just before oven drying are transferred to a hardness tester, and the amount of torque (pound force-inch (lbf-in)) needed to extrude the cuttings through small apertures located in the bottom of the test cell is recorded for every full rotation. The hardness tester used is custom built, but such devices are well known, for example see: Aston, M. S.; Elliot, G. P. Water-Based Glycol Drilling Muds: Shale Inhibition Mechanisms, Paper 28818; Presented at the SPE European Petroleum Conference, London, 25-27 Oct. 1994 and Patel, A. D. Design and Development of Quaternary Amine Compounds: Shale Inhibition with Improved Environmental Profile, Paper 121737; Presented at the SPE International Symposium on Oilfield Chemistry, The Woodlands, 20-22 Apr. 2009. The maximum gauge reading of the hardness tester is 300 lbf-in. Hardness values reported in Table 2 are reported as the maximum torque (max. torque) reached and the number of turns required to reach the maximum torque.

The cutting recovery, hardness performance, and water content for Examples 5 to 9 are summarized in Table 2. Additives which are able to maintain shale hardness, and thus, provide greater resistance to extrusion are favored. Higher recovery means that the shale is rendered less reactive (e.g. dispersive) and more stable. More resistance, or recovery, means that the integrity or strength of the shale has been better preserved when exposed to the drilling fluid. Water content is determined by comparing the wet mass with the dry mass.

TABLE 2

| Example | Polyaminopolyamide-epichlorohydrin resin | % Recovery | % Water | Hardness, max. torque (lbf-in) × no. turns |
|---|---|---|---|---|
| 5* | none | 4 | 38.7 | 0 × 15 |
| 6 | Example 1 | 95 | 35.9 | 300** × 9 |
| 7 | Example 2 | 93.1 | 36.2 | 300** × 5 |
| 8 | Example 3 | 93.4 | 34.7 | 300** × 2 |
| 9 | Example 4 | 92.9 | 36.9 | 300** × 7 |

*not an example of the present invention
**max. torque of sample exceeds the upper limit (300 lbf-in) of the hardness tester gauge

What is claimed is:

1. An aqueous based drilling fluid composition comprising:
   i) an aqueous based continuous phase;
   ii) a reactive clay or shale material; and
   iii) a shale hydration inhibition agent comprising a polyaminopolyamide-epichlorohydrin resin,
   wherein the shale hydration inhibition agent is present in sufficient concentration to reduce the reactivity of the clay or shale.

2. The composition of claim 1 wherein the polyaminopolyamide-epichlorohydrin resin is a reaction product of
   a) an aliphatic polyamine,
   b) an aliphatic polycarboxylic acid, and
   c) epichlorohydrin.

3. The composition of claim 2 wherein
   a) the aliphatic polyamine is diethylenetriamine (DETA), bis(2-piperazin-1-ylethyl)amine (BPEA), one or more congener of triethylenetetramine (TETA), one or more congener of tetraethylenepentamine (TEPA), one or more congener of pentaethylenehexamine (PEHA), dipropylenetriamine (DPTA), or mixtures thereof and
   b) the aliphatic polycarboxylic acid is malonic acid, succinic acid, glutaric acid, adipic acid, pimelic acid, suberic acid, azelaic acid, sebacic acid, citric acid, isocitric acid, propane-1,2,3-dicarboxylic acids, or mixtures thereof.

4. The composition of claim 2 is the reaction product of adipic acid and DETA, adipic acid and TETA, adipic acid and L-TETA, adipic acid and a mixture of DETA and TETA, adipic acid and a mixture of DETA and L-TETA, adipic acid and a mixture of TETA and L-TETA; or adipic acid and a mixture of TETA, L-TETA and DETA.

5. The composition of claim 1 further comprising one or more of a fluid loss control agent, a weighting material, a viscosifying agent, a bridging agent, an anti-bit balling agent, a dispersant, a lubricant, a corrosion inhibitor, a defoamer, salts, a surfactant, or suspending agent.

6. The composition of claim 1 wherein the aqueous based continuous phase is fresh water, sea water, brine, mixtures of water and water soluble organic compounds, or mixtures thereof.

7. A method for reducing the reactivity of clays and shale in drilling operations comprising the step of circulating down a drill string of a subterranean wellbore an aqueous based drilling fluid comprising a shale hydration inhibition agent comprising a polyaminopolyamide-epichlorohydrin resin, wherein the shale hydration inhibition agent is present in sufficient concentration to reduce the reactivity of the clay or shale.

8. The method of claim 7 wherein the polyaminopolyamide-epichlorohydrin resin is a reaction product of
   a) an aliphatic polyamine,
   b) an aliphatic polycarboxylic acid, and
   c) epichlorohydrin.

9. The method of claim 7 wherein
   a) the aliphatic polyamine is diethylenetriamine (DETA), bis(2-piperazin-1-ylethyl)amine (BPEA), one or more congener of triethylenetetramine (TETA), one or more congener of tetraethylenepentamine (TEPA), one or more congener of pentaethylenehexamine (PEHA), dipropylenetriamine (DPTA), or mixtures thereof and
   b) the aliphatic polycarboxylic acid is malonic acid, succinic acid, glutaric acid, adipic acid, pimelic acid, suberic acid, azelaic acid, sebacic acid, citric acid, isocitric acid, propane-1,2,3-dicarboxylic acids, or mixtures thereof.

10. The method of claim 8 wherein the polyaminopolyamide-epichlorohydrin resin is the reaction product of adipic acid and DETA, adipic acid and TETA, adipic acid and L-TETA, adipic acid and a mixture of DETA and TETA, adipic acid and a mixture of DETA and L-TETA, adipic acid and a mixture of TETA and L-TETA; or adipic acid and a mixture of TETA, L-TETA and DETA.

11. The method of claim 7 further comprising one or more of a fluid loss control agent, a weighting material, a viscosifying agent, a bridging agent, an anti-bit balling agent, a dispersant, a lubricant, a corrosion inhibitor, a defoamer, salts, a surfactant, or suspending agent.

12. The method of claim 7 wherein the aqueous based continuous phase is fresh water, sea water, brine, mixtures of water and water soluble organic compounds, or mixtures thereof.

* * * * *